United States Patent
Choi et al.

(10) Patent No.: US 10,683,313 B2
(45) Date of Patent: Jun. 16, 2020

(54) POLYHEDRAL OLIGOMERIC SILSESQUIOXANE AND PREPARATION METHOD THEREOF

(71) Applicant: LG Chem, Ltd., Seoul (KR)

(72) Inventors: Ji Young Choi, Daejeon (KR); Dai Seung Choi, Daejeon (KR); Young Jee Song, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 16/070,310

(22) PCT Filed: Mar. 9, 2017

(86) PCT No.: PCT/KR2017/002586
§ 371 (c)(1),
(2) Date: Jul. 16, 2018

(87) PCT Pub. No.: WO2017/160023
PCT Pub. Date: Sep. 21, 2017

(65) Prior Publication Data
US 2019/0023728 A1    Jan. 24, 2019

(30) Foreign Application Priority Data

Mar. 17, 2016   (KR) .................. 10-2016-0032284

(51) Int. Cl.

| | | |
|---|---|---|
| *C07F 7/21* | (2006.01) |
| *C08G 77/24* | (2006.01) |
| *C09D 183/08* | (2006.01) |
| *C08J 7/04* | (2020.01) |
| *C08G 77/20* | (2006.01) |
| *C08G 77/04* | (2006.01) |
| *C09D 5/00* | (2006.01) |

(52) U.S. Cl.
CPC ............ *C07F 7/21* (2013.01); *C08G 77/045* (2013.01); *C08G 77/20* (2013.01); *C08G 77/24* (2013.01); *C08J 7/042* (2013.01); *C08J 7/0427* (2020.01); *C09D 5/006* (2013.01); *C09D 183/08* (2013.01); *C08J 2483/06* (2013.01); *C08J 2483/07* (2013.01); *C08J 2483/08* (2013.01)

(58) Field of Classification Search
None
See application file for complete search history.

(56) References Cited

U.S. PATENT DOCUMENTS

| | | |
|---|---|---|
| 6,329,490 B1 | 12/2001 | Yamashita et al. |
| 8,506,853 B2 | 8/2013 | Wada et al. |
| 9,409,933 B2 | 8/2016 | Warner |
| 2002/0042020 A1 | 4/2002 | Gallagher et al. |
| 2004/0030084 A1 | 2/2004 | Morimoto et al. |
| 2004/0241579 A1 | 12/2004 | Hamada et al. |
| 2006/0058488 A1 | 3/2006 | Kuhnle et al. |
| 2007/0122636 A1 | 5/2007 | Taylor |
| 2008/0131815 A1 | 6/2008 | Kim et al. |
| 2010/0093951 A1 | 4/2010 | Oikawa et al. |
| 2011/0045186 A1 | 2/2011 | Gervasi et al. |
| 2012/0157702 A1 | 6/2012 | Marciniec et al. |

FOREIGN PATENT DOCUMENTS

| | | |
|---|---|---|
| CN | 103288867 A | 9/2013 |
| EP | 1511801 B1 | 12/2005 |
| JP | 2000290286 A | 10/2000 |
| JP | 2004123698 A | 4/2004 |
| JP | 2005272506 A | 10/2005 |
| JP | 2011046195 A | 3/2011 |
| JP | 2012251035 A | 12/2012 |
| JP | 5662864 B2 | 2/2015 |
| KR | 20020028820 A | 4/2002 |
| KR | 20040102340 A | 12/2004 |
| KR | 100722731 B1 | 5/2007 |
| KR | 20080048822 A | 6/2008 |
| KR | 20080072751 A | 8/2008 |
| KR | 20100131312 A | 12/2010 |
| KR | 20140021634 A | 2/2014 |
| KR | 20140140139 A | 12/2014 |
| TW | 201444924 A | 12/2014 |
| WO | 2008072765 A1 | 6/2008 |

OTHER PUBLICATIONS

International Search Report for Application No. PCT/KR2017/002586 dated Jul. 10, 2017.

*Primary Examiner* — Clinton A Brooks
(74) *Attorney, Agent, or Firm* — Lerner, David, Littenberg, Krumholz & Mentlik, LLP

(57) ABSTRACT

Provided are a polyhedral oligomeric silsesquioxane and a preparation method thereof, more particularly, a polyhedral oligomeric silsesquioxane itself which has a low refractive property and enables formation of a coating layer with excellent chemical and mechanical properties, and provides excellent adhesive strength for the surfaces of various substrates, and a preparation method thereof.

14 Claims, No Drawings

POLYHEDRAL OLIGOMERIC SILSESQUIOXANE AND PREPARATION METHOD THEREOF

CROSS-REFERENCE TO RELATED APPLICATIONS

The present application is a national phase entry under 35 U.S.C. § 371 of International Application No. PCT/KR2017/002586 filed Mar. 9, 2017, which claims priority from Korean Patent Application No. 10-2016-0032284 filed Mar. 17, 2016, the disclosures of which are incorporated herein by reference.

TECHNICAL FIELD

The present invention relates to a polyhedral oligomeric silsesquioxane and a preparation method thereof.

BACKGROUND ART

Polyhedral oligomeric silsesquioxane (POSS) means a siloxane-based material having a three dimensional structure, and is generally represented by a molecular formula of $(RSiO_{1.5})_n$.

POSS has a silicon-oxygen bond which is an inorganic framework constituting a basic structure of a molecule, and R may consist of various organic groups. Therefore, POSS has been studied as an organic-inorganic hybrid nano-scale material.

Since POSS has a molecular diameter in the range of several nanometers, it exhibits a quantum size effect, a quantum surface effect, a quantum interface effect, etc., and due to these quantum properties, the POSS material may have specific physical and chemical properties in many different aspects such as thermal conductivity, electrical conductivity, optical and magnetic behaviors, hydrophilicity, lipophilicity, etc., and also allows introduction of these properties onto the surface of a polymer, etc.

Particularly, POSS has a basic structure consisting of silicon-oxygen bonds (silsesquioxane type), and therefore, the molecular structure has very high physical and chemical stability and high thermal resistance and flame resistance. Under high temperature and high pressure conditions, the inorganic framework of POSS is broken to produce silica ($SiO_2$), which may form a separate coating layer. This coating layer may very effectively function as a protecting layer.

Further, a variety of functional groups may bind to silicon atoms in the basic silsesquioxane structure of POSS, and therefore, it is easy to provide many different new physical properties depending on structures of organic groups to be introduced.

DISCLOSURE

Technical Problem

The present invention provides a polyhedral oligomeric silsesquioxane which has a low refractive property as it is, enables formation of a coating layer with excellent chemical and mechanical properties on the surfaces of many different substrates, and has high compatibility with various organic solvents, and a preparation method thereof.

Technical Solution

The present invention provides a polyhedral oligomeric silsesquioxane represented by the following Chemical Formula 1:

$(R^1SiO_{1.5})_x(R^2SiO_{1.5})_y(R^3SiO_{1.5})_z$   [Chemical Formula 1]

wherein $R^1$ and $R^2$ are hydrocarbyl groups having 1 to 10 carbon atoms, in which at least one hydrogen atom is substituted with a halogen atom, and $R^1$ and $R^2$ are different from each other, $R^3$ is an unsaturated functional group;

x and y are each independently an integer of 1 to 12, and z is an integer of 2 to 12.

Further, the present invention provides a method of preparing the polyhedral oligomeric silsesquioxane, the method including the step of reacting a reaction mixture including a first silane compound represented by the following Chemical Formula 1x, a second silane compound represented by the following Chemical Formula 1y, and a third silane compound represented by the following Chemical Formula 1z:

$R^1SiX^1_3$   [Chemical Formula 1x]

$R^2SiX^2_3$   [Chemical Formula 1y]

$R^3$—$SiX^3_3$   [Chemical Formula 1z]

wherein $R^1$ and $R^2$ are hydrocarbyl groups having 1 to 10 carbon atoms, in which at least one hydrogen atom is substituted with a halogen atom, and $R^1$ and $R^2$ are different from each other, $R^3$ is an unsaturated functional group;

$X^1$ to $X^3$ are the same as or different from each other, and each independently a halogen atom or an alkoxy group having 1 to 5 carbon atoms.

Effect of the Invention

A polyhedral oligomeric silsesquioxane of the present invention has a low refractive property as it is, enables formation of a coating layer with excellent chemical and mechanical properties on the surfaces of many different substrates, and has high compatibility with various organic solvents, thereby being used in a variety of applications.

Further, according to a preparation method of the present invention, the polyhedral oligomeric silsesquioxane with high purity may be synthesized by minimizing production of by-products having different structures.

DETAILED DESCRIPTION OF THE EMBODIMENTS

A polyhedral oligomeric silsesquioxane of the present invention is represented by the following Chemical Formula 1:

$(R^1SiO_{1.5})_x(R^2SiO_{1.5})_y(R^3SiO_{1.5})_z$   [Chemical Formula 1]

wherein $R^1$ and $R^2$ are hydrocarbyl groups having 1 to 10 carbon atoms, in which at least one hydrogen atom is substituted with a halogen atom, and $R^1$ and $R^2$ are different from each other, $R^3$ is an unsaturated functional group;

x and y are each independently an integer of 1 to 12, and z is an integer of 2 to 12.

Further, a method of preparing the polyhedral oligomeric silsesquioxane of the present invention includes the step of reacting a reaction mixture including a first silane compound represented by the following Chemical Formula 1x, a second silane compound represented by the following Chemical Formula 1y, and a third silane compound represented by the following Chemical Formula 1z:

$R^1SiX^1_3$   [Chemical Formula 1x]

$R^2SiX^2_3$   [Chemical Formula 1y]

$R^3$—$SiX^3_3$   [Chemical Formula 1z]

wherein R$^1$ and R$^2$ are hydrocarbyl groups having 1 to 10 carbon atoms, in which at least one hydrogen atom is substituted with a halogen atom, and R$^1$ and R$^2$ are different from each other, R$^3$ is an unsaturated functional group;

X$^1$ to X$^3$ are the same as or different from each other, and each independently a halogen atom or an alkoxy group having 1 to 5 carbon atoms.

In the present invention, the terms "the first", "the second", and the like are used to describe a variety of components, and these terms are merely employed to differentiate a certain component from other components.

Further, the terms used in this description are just for explaining exemplary embodiments and it is not intended to restrict the present invention. The singular expression may include the plural expression unless it is differently expressed contextually. It must be understood that the term "include", "equip", or "have" in the present description is only used for designating the existence of characteristics taken effect, numbers, steps, components, or combinations thereof, and do not exclude the existence or the possibility of addition of one or more different characteristics, numbers, steps, components, or combinations thereof beforehand.

While the present invention is susceptible to various modifications and alternative forms, specific embodiments will be illustrated and described in detail as follows. It should be understood, however, that the description is not intended to limit the present invention to the particular forms disclosed, but on the contrary, the intention is to cover all modifications, equivalents, and alternatives falling within the spirit and scope of the invention.

The hydrocarbyl group, as used throughout this specification, is defined as a monovalent organic functional group composed of carbon and hydrogen, and may include all of an unsaturated hydrocarbon including a carbon-carbon double bond and/or a carbon-carbon triple bond and a saturated hydrocarbon. The hydrocarbon may include a linear, branched, or cyclic structure, or two or more structures thereof. More specifically, the hydrocarbon may be alkane, alkene, alkyne, or arene including a linear, branched, or cyclic structure, one or more of which may be substituted or linked to another one.

The unsaturated functional group, as used throughout this specification, is defined as a hydrocarbyl group or a heterohydrocarbyl group including a carbon-carbon double bond and/or a carbon-carbon triple bond, or a functional group which is a cyclic group having 4 atoms or less and may be converted into a saturated form by additions reactions of carbon multiple bonds or ring opening reactions.

Hereinafter, the present invention will be described in more detail.

A polyhedral oligomeric silsesquioxane according to an aspect of the present invention is represented by the following Chemical Formula 1:

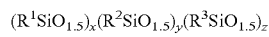
[Chemical Formula 1]

$(R^1SiO_{1.5})_x(R^2SiO_{1.5})_y(R^3SiO_{1.5})_z$ wherein R$^1$ and R$^2$ are hydrocarbyl groups having 1 to 10 carbon atoms, in which at least one hydrogen atom is substituted with a halogen atom, and R$^1$ and R$^2$ are different from each other, R$^3$ is an unsaturated functional group;

x and y are each independently an integer of 1 to 12, and z is an integer of 2 to 12.

According to an embodiment of the present invention, R$^1$ and R$^2$ may be each independently a trifluoromethyl group, a trifluoroethyl group, a trifluoropropyl group, a trifluorobutyl group, a pentafluorobutyl group, a trifluoropentyl group, a pentafluoropentyl group, a heptafluoropentyl group, a trifluorohexyl group, a pentafluorohexyl group, a heptafluorohexyl group, a nonafluorohexyl group, a trifluoroheptyl group, a pentafluoroheptyl group, a heptafluoroheptyl group, a nonafluoroheptyl group, a dodecafluoroheptyl group, a chloropropyl group, or a dibromoethyl group, and more preferably, a fluoro(F)-substituted alkyl group.

In the polyhedral silsesquioxane, R$^1$ or R$^2$ is an organic group linked to a silicon atom. The basic silsesquioxane framework is centered, and the above described organic groups are formed to protrude radially outside of a polyhedron, thereby effectively manifesting properties of the organic groups.

In particular, when a halogen-substituted hydrocarbyl group is introduced, the material itself has a low refractive property even without adding a pore forming agent, and a composition including this compound may be used to easily provide an optical device such as an anti-reflection film, etc.

In particular, when a fluoro-substituted hydrocarbyl group is introduced, it enables formation of a coating layer having excellent chemical and mechanical properties such as water repellency, oil repellency, chemical resistance, abrasion resistance, etc. on the surfaces of various substrates.

In this regard, for example, R$^1$ may have preferably a substitution ratio of the halogen atom in the hydrocarbyl group of less than 50%, and for another example, R$^2$ may have preferably a substitution ratio of the halogen atom in the hydrocarbyl group of 50% or more.

The substitution ratio of the halogen atom in the hydrocarbyl group means a ratio of the number of substituted halogen atoms in R$^1$ and R$^2$ hydrocarbyl groups to the total number of hydrogen atoms in a hydrocarbyl group having the same structure in which no hydrogen atoms are substituted, and the substitution ratio is expressed as %.

That is, R$^1$ having a substitution ratio of the halogen atom in the hydrocarbyl group of less than 50% means R$^1$ having the number of the substituted halogen atoms smaller than the number of remaining hydrogen atoms in the hydrocarbyl group, and R$^2$ having a substitution ratio of the halogen atom in the hydrocarbyl group of 50% or more means R$^2$ having the number of the substituted halogen atoms equal to or larger than the number of remaining hydrogen atoms in the hydrocarbyl group.

As the number of the substituted halogen atoms is larger, it is easier to impart the above-described chemical, optical, and mechanical properties, but the compatibility with a solvent or an additive generally used together is reduced.

Therefore, a hydrocarbyl organic functional group having a large number of substituted halogen atoms in a molecule and a hydrocarbyl organic functional group having a small number of substituted halogen atoms in a molecule are introduced at the same time to increase compatibility with many different solvents or additives while maintaining excellent chemical, optical, and physical properties.

The hydrocarbyl group having the substitution ratio of the halogen atom of less than 50% may include specifically, for example, a trifluoropropyl group, a trifluorobutyl group, a trifluoropentyl group, a pentafluoropentyl group, a trifluorohexyl group, a pentafluorohexyl group, a trifluoroheptyl group, a pentafluoroheptyl group, a heptafluoroheptyl group, a chloropropyl group, or a dibromoethyl group, etc., and the hydrocarbyl group having the substitution ratio of the halogen atom of 50% or more may include specifically, for example, a trifluoromethyl group, a trifluoroethyl group, a pentafluorobutyl group, a heptafluoropentyl group, a heptafluorohexyl group, a nonafluorohexyl group, a nonafluoroheptyl group, a dodecafluoroheptyl group, etc. However, the present invention is not limited thereto.

According to another example of the present invention, $R^3$ may be preferably an ethylenic unsaturated functional group or an epoxide unsaturated functional group.

$R^3$ may be specifically, for example, a hydrocarbyl group or a hydrocarbyloxy group having 1 to 30 carbon atoms, which is substituted with one or more substituents selected from the group consisting of a (meth)acryloyl group, a (meth)acryloyloxy group, a glycidyl group, an epoxy group, and a vinyl group. That is, at least one hydrogen atom binding to a carbon atom in the hydrocarbyl group or the hydrocarbyloxy group having 1 to 30 carbon atoms is substituted with the above-described ethylenic unsaturated functional group or epoxide unsaturated functional group such that $R^3$ may be in the form of an unsaturated functional group Such functional group may provide the polyhedral oligomeric silsesquioxane compound with excellent adhesive strength for the surfaces of various substrates, and also may improve mechanical properties such as abrasion resistance or scratch resistance of the surface upon coating.

According to an Examples of the present invention, Chemical Formula 1 may satisfy $6 \leq x+y+z \leq 30$, and preferably $6 \leq x+y+z \leq 14$. That is, when the x, y, and z coefficients satisfy the above range, silicon atoms and oxygen atoms may be positioned at the vertex or edge of each polyhedron, thereby forming a completely condensed structure of a stable form.

According to another Example of the present invention, x:y may be preferably about 5:1 to about 1:5. That is, in a polyhedral oligomeric silsesquioxane molecule, a ratio of a silicon atom moiety having a hydrocarbyl functional group having a low substitution ratio of a halogen atom, and a silicon atom moiety having a hydrocarbyl functional group having a high substitution ratio of a halogen atom is preferably within the above range.

When the ratio of x to y is too small, there is a problem that compatibility with various organic solvents or additives may be deteriorated. In the opposite case, there is a problem that a refractive index may be increased, or water repellency, oil repellency, chemical resistance, etc. may be deteriorated.

According to still another Example of the present invention, it is more preferable that a value of (x+y)/z in Chemical Formula 1 satisfies about 0.2 or more and about 0.3 or less. In other words, in the polyhedral oligomeric silsesquioxane molecule, a ratio of a silicon atom moiety having a halogen-substituted hydrocarbyl group and a silicon atom moiety having an unsaturated functional group is preferably within the above range.

When the ratio of the silicon atom moiety having the halogen-substituted hydrocarbyl group is too small, there is a problem that the above-described chemical and mechanical physical properties obtained by using the halogen-substituted hydrocarbyl group may be deteriorated. In contrast, when the ratio of the silicon atom moiety having the unsaturated functional group is too small, there is a problem that adhesive force to a substrate may be reduced, and mechanical properties such as abrasion resistance, scratch resistance, etc. may be deteriorated.

The polyhedral oligomeric silsesquioxane of the present invention itself may have a refractive index of about 1.20 to about 1.50 to exhibit a low refractive property. The material may be applied, as it is or in the form of a coating composition including the material, onto a target substrate, thereby easily providing an optical device, such as antireflection film, etc.

Meanwhile, according to another aspect of the present invention, provided is a method of preparing the polyhedral oligomeric silsesquioxane, the method including the step of reacting a reaction mixture including the first silane compound represented by the following Chemical Formula 1x, the second silane compound represented by the following Chemical Formula 1y, and the third silane compound represented by the following Chemical Formula 1z:

   [Chemical Formula 1x]

   [Chemical Formula 1y]

   [Chemical Formula 1z]

wherein $R^1$ and $R^2$ are hydrocarbyl groups having 1 to 10 carbon atoms, in which at least one hydrogen atom is substituted with a halogen atom, and $R^1$ and $R^2$ are different from each other, $R^3$ is an unsaturated functional group;

$X^1$ to $X^3$ are the same as or different from each other, and each independently a halogen atom or an alkoxy group having 1 to 5 carbon atoms.

A siloxane structure formed by a Si—O—Si bond is generally defined by four types (Q, T, D, and M), and a silsesquioxane represented by [$RSiO_{1.5}$] has a T unit structure among the four types.

Such silsesquioxane is synthesized by hydrolytic polymerization, and a method of using trialkoxysilane is generally known. Polysilsesquioxane synthesized thereby is known to commonly have high regularity. However, it is known that oligomeric silsesquioxane such as a hexamer, an octamer, a decamer, or a dodecamer has a cage structure, a ladder structure, or an irregular mixed structure, and therefore, oligomeric silsesquioxane does not meet the expected chemical and mechanical properties.

However, according to the method of an aspect of the present invention, provided is a polyhedral oligomeric silsesquioxane having a highly regular cage structure with high purity.

According to an Example of the present invention, $R^1$ and $R^2$ may be each independently a trifluoromethyl group, a trifluoroethyl group, a trifluoropropyl group, a trifluorobutyl group, a pentafluorobutyl group, a trifluoropentyl group, a pentafluoropentyl group, a heptafluoropentyl group, a trifluorohexyl group, a pentafluorohexyl group, a heptafluorohexyl group, a nonafluorohexyl group, a trifluoroheptyl group, a pentafluoroheptyl group, a heptafluoroheptyl group, a nonafluoroheptyl group, a dodecafluoroheptyl group, a chloropropyl group, a dibromoethyl group, etc., and more preferably, a fluoro(F)-substituted alkyl group.

The first silane compound of Chemical Formula 1x is a precursor for introducing the halogen-substituted hydrocarbyl group into the polyhedral oligomeric silsesquioxane. In particular, by using a compound wherein $R^1$ is a monovalent moiety derived from a halogen-substituted hydrocarbon, as the first silane compound, the polyhedral oligomeric silsesquioxane may be provided with properties such as low refractive property, water repellency, oil repellency, chemical resistance, lubricity, abrasion resistance, etc., and also provided with increased compatibility with various organic solvents at the same time.

$R^1$ may preferably have a substitution ratio of the halogen atom in the hydrocarbyl group of less than 50%, and a silane compound including this functional group may include specifically, for example, an alkoxy silane compound including a trifluoropropyl group, a trifluorobutyl group, a trifluoropentyl group, a pentafluoropentyl group, a trifluorohexyl group, a pentafluorohexyl group, a trifluoroheptyl group, a pentafluoroheptyl group, a heptafluoroheptyl group, a chloropropyl group, or a dibromoethyl group.

The second silane compound of Chemical Formula 1y is also a precursor for introducing the halogen-substituted hydrocarbyl group into the polyhedral oligomeric silsesquioxane. In particular, by using a compound wherein $R^1$ is a monovalent moiety derived from a halogen-substituted hydrocarbon, as the first silane compound, the polyhedral oligomeric silsesquioxane may be provided with properties such as low refractive property, water repellency, oil repellency, chemical resistance, lubricity, abrasion resistance, etc.

$R^2$ may preferably have a substitution ratio of the halogen atom in the hydrocarbyl group of 50% or more, and a silane compound including this functional group may include specifically, for example, an alkoxy silane compound including a trifluoromethyl group, a trifluoroethyl group, a pentafluorobutyl group, a heptafluoropentyl group, a heptafluorohexyl group, a nonafluorohexyl group, a nonafluoroheptyl group, a dodecafluoroheptyl group, etc.

Further, the third silane compound of Chemical Formula 1z is a precursor for introducing the hydrocarbyl group substituted with various functional groups into the polyhedral oligomeric silsesquioxane. $R^3$ may be preferably an ethylenic unsaturated functional group or an epoxide unsaturated functional group, and a silane compound including this functional group may include specifically, for example, an alkoxy silane compound including a (meth)acryloyl group, a (meth)acryloyloxy group, a glycidyl group, an epoxy group, a vinyl group, etc.

The above-described first, second, and third silane compounds are precursor materials for forming respective units having x, y, or z coefficient in the above-described polyhedral oligomeric silsesquioxane compound of Chemical Formula 1, and are the same as in the description of the polyhedral oligomeric silsesquioxane compound of Chemical Formula 1.

In the preparation method according to an embodiment, the first, second, and third silane compounds may be preferably reacted in the presence of a basic catalyst. This reaction condition may further increase a yield of a product.

A variety of compounds used in the art to which the present invention pertains may be used as the basic catalyst without limitation. However, ammonium hydroxide among various basic catalysts may be used to minimize side-reactions and to improve a synthesis yield of the polyhedral oligomeric silsesquioxane. More specifically, methylammonium hydroxide, tetramethylammonium hydroxide, ethylammonium hydroxide, tetraethylammonium hydroxide, etc. may be used as the ammonium hydroxide. An amount of the basic catalyst used is not particularly limited, but the basic catalyst may be used in an amount of about 0.001 moles to about 100 moles with respect to total 100 moles of the silane compound. Within this range, side-reactions may be minimized and polyhedral oligomeric silsesquioxane may be synthesized with high purity and high efficiency.

Further, according to the preparation method of an embodiment, the reaction mixture may be reacted in the presence of an organic solvent. As a result, production of high molecular weight by-products having different structures other than polyhedral oligomeric silsesquioxane having a cage structure may be further inhibited. The organic solvent may be any organic solvent without limitation, as long as it may exhibit proper solubility to respective silane compounds while not influencing the reaction of the silane compound. A specific example of the organic solvent may be an ether solvent such as diethylether, tetrahydrofuran, etc.

The reaction mixture including the first, second, and third silane compounds may be reacted at room temperature for a suitable period of time. The reaction time is not particularly limited, but the reaction may be allowed for about 5 hours to about 128 hours to increase the yield of the polyhedral oligomeric silsesquioxane.

The polyhedral oligomeric silsesquioxane prepared by the above-described method may have high purity and may exhibit a low refractive property as it is. For example, the polyhedral oligomeric silsesquioxane may have a refractive index of about 1.20 to about 1.50, as measured by using an Abbe refractometer.

The polyhedral oligomeric silsesquioxane of the present invention may be used in a low refractive index layer of an anti-reflection film of a display device to achieve a very low reflectance. In particular, when the polyhedral oligomeric silsesquioxane is used, an additional process of achieving a low refractive index by generating bubbles may be omitted. Therefore, it is expected to provide a high-quality, economical anti-reflection film.

Hereinafter, the actions and effects of the present invention will be described in more detail with reference to the specific Examples. However, these Examples are for illustrative purposes only, and the scope of the invention is not intended to be limited by these examples.

EXAMPLE

Synthesis of Polyhedral Oligomeric Silsesquioxane

Example 1

15 g of (3,3,3-trifluoropropyl)trimethoxysilane, 6.3 g of (nonafluorohexyl)trimethoxysilane, and 12.1 g of (3-acryloxypropyl)trimethoxysilane were dissolved in 140 mL of THF (tetrahydrofuran), and 8.2 g of 5 wt % $N(CH_3)_4OH$ aqueous solution was added thereto.

Thereafter, a reaction mixture was reacted under stirring at room temperature for 72 hours. After completion of the reaction, the solvent THF was removed under reduced pressure and a resultant was dissolved in 150 mL of ethyl acetate, and by-products were extracted with a NaCl aqueous solution four times.

Then, an organic layer was dried over $MgSO_4$ and filtered, and then a filtrate was dried under reduced pressure to obtain 23 g of a liquid-phase polyhedral oligomeric silsesquioxane (TNA413). A refractive index thereof was 1.414, as measured by using an Abbe refractometer (DTM-1, ATAGO).

Example 2

10 g of (3,3,3-trifluoropropyl)trimethoxysilane, 11.2 g of (nonafluorohexyl)trimethoxysilane, and 10.7 g of (3-acryloxypropyl)trimethoxysilane were dissolved in 120 mL of THF (tetrahydrofuran), and 7.5 g of 5 wt % N(CH$_3$)$_4$OH aqueous solution was added thereto.

Thereafter, a reaction mixture was reacted under stirring at room temperature for 72 hours. After completion of the reaction, the solvent THF was removed under reduced pressure and a resultant was dissolved in 150 mL of ethyl acetate, and by-products were extracted with a NaCl aqueous solution four times.

Then, an organic layer was dried over MgSO$_4$ and filtered, and then a filtrate was dried under reduced pressure to obtain 22 g of a liquid-phase polyhedral oligomeric silsesquioxane (TNA323). A refractive index thereof was 1.405, as measured by using an Abbe refractometer (DTM-1, ATAGO).

Example 3

8 g of (3,3,3-trifluoropropyl)trimethoxysilane, 20.2 g of (nonafluorohexyl)trimethoxysilane, and 12.9 g of (3-acryloxypropyl)trimethoxysilane were dissolved in 150 mL of THF (tetrahydrofuran), and 9 g of 5 wt % N(CH$_3$)$_4$OH aqueous solution was added thereto.

Thereafter, a reaction mixture was reacted under stirring at room temperature for 72 hours. After completion of the reaction, the solvent THF was removed under reduced pressure and a resultant was dissolved in 150 mL of ethyl acetate, and by-products were extracted with a NaCl aqueous solution four times.

Then, an organic layer was dried over MgSO$_4$ and filtered, and then a filtrate was dried under reduced pressure to obtain 30 g of a liquid-phase polyhedral oligomeric silsesquioxane (TNA233). A refractive index thereof was 1.398, as measured by using an Abbe refractometer (DTM-1, ATAGO).

Example 4

3 g of (3,3,3-trifluoropropyl)trimethoxysilane, 20.2 g of (nonafluorohexyl)trimethoxysilane, and 9.7 g of (3-acryloxypropyl)trimethoxysilane were dissolved in 110 mL of THF (tetrahydrofuran), and 6.8 g of 5 wt % N(CH$_3$)$_4$OH aqueous solution was added thereto.

Thereafter, a reaction mixture was reacted under stirring at room temperature for 72 hours. After completion of the reaction, the solvent THF was removed under reduced pressure and a resultant was dissolved in 150 mL of ethyl acetate, and by-products were extracted with a NaCl aqueous solution four times.

Then, an organic layer was dried over MgSO$_4$ and filtered, and then a filtrate was dried under reduced pressure to obtain 24 g of a liquid-phase polyhedral oligomeric silsesquioxane (TNA143). A refractive index thereof was 1.394, as measured by using an Abbe refractometer (DTM-1, ATAGO).

Example 5

16 g of (3,3,3-trifluoropropyl)trimethoxysilane, 30 g of (1H, 1, 2H, 2H-perfluorooctyl)trimethoxysilane, and 8.6 g of (3-acryloxypropyl)trimethoxysilane were dissolved in 146 mL of THF, and 12.9 g of 5 wt % tetramethylammonium hydroxide aqueous solution was added thereto.

Thereafter, a reaction mixture was reacted under stirring at room temperature for 72 hours. After completion of the reaction, the solvent THF was removed under reduced pressure and a resultant was dissolved in 170 mL of ethyl acetate, and by-products were extracted with a NaCl aqueous solution four times.

Then, an organic layer was dried over MgSO$_4$ and filtered, and then a filtrate was dried under reduced pressure to obtain 20 g of a liquid-phase polyhedral oligomeric silsesquioxane (THA413). A refractive index thereof was 1.407, as measured by using an Abbe refractometer (DTM-1, ATAGO).

Example 6

12 g of (3,3,3-trifluoropropyl)trimethoxysilane, 17 g of (1H, 1, 2H, 2H-Perfluorooctyl)trimethoxysilane, and 12.9 g of (3-acryloxypropyl)trimethoxysilane were dissolved in 146 mL of THF, and 9.0 g of 5 wt % tetramethylammonium hydroxide aqueous solution was added thereto.

Thereafter, a reaction mixture was reacted under stirring at room temperature for 72 hours. After completion of the reaction, the solvent THF was removed under reduced pressure and a resultant was dissolved in 170 mL of ethyl acetate, and by-products were extracted with a NaCl aqueous solution four times.

Then, an organic layer was dried over MgSO$_4$ and filtered, and then a filtrate was dried under reduced pressure to obtain 24 g of a liquid-phase polyhedral oligomeric silsesquioxane (THA323). A refractive index thereof was 1.397, as measured by using an Abbe refractometer (DTM-1, ATAGO).

Example 7

8 g of (3,3,3-trifluoropropyl)trimethoxysilane, 25.7 g of (1H, 1, 2H, 2H-Perfluorooctyl)trimethoxysilane, and 12.9 g of (3-acryloxypropyl)trimethoxysilane were dissolved in 146 mL of THF, and 9.0 g of 5 wt % tetramethylammonium hydroxide aqueous solution was added thereto.

Thereafter, a reaction mixture was reacted under stirring at room temperature for 72 hours. After completion of the reaction, the solvent THF was removed under reduced pressure and a resultant was dissolved in 170 mL of ethyl acetate, and by-products were extracted with a NaCl aqueous solution four times.

Then, an organic layer was dried over MgSO$_4$ and filtered, and then a filtrate was dried under reduced pressure to obtain 27 g of a liquid-phase polyhedral oligomeric silsesquioxane (THA233). A refractive index thereof was 1.389, as measured by using an Abbe refractometer (DTM-1, ATAGO).

Example 8

4 g of (3,3,3-trifluoropropyl)trimethoxysilane, 34.3 g of (1H, 1, 2H, 2H-Perfluorooctyl)trimethoxysilane, and 12.9 g of (3-acryloxypropyl)trimethoxysilane were dissolved in 146 mL of THF, and 9.0 g of 5 wt % tetramethylammonium hydroxide aqueous solution was added thereto.

Thereafter, a reaction mixture was reacted under stirring at room temperature for 72 hours. After completion of the reaction, the solvent THF was removed under reduced pressure and a resultant was dissolved in 170 mL of ethyl acetate, and by-products were extracted with a NaCl aqueous solution four times.

Then, an organic layer was dried over MgSO$_4$ and filtered, and then a filtrate was dried under reduced pressure to obtain 30 g of a liquid-phase polyhedral oligomeric silsesquioxane (THA143). A refractive index thereof was 1.375, as measured by using an Abbe refractometer (DTM-1, ATAGO).

Comparative Example 1

25 g of (3,3,3-trifluoropropyl)trimethoxysilane and 16.1 g of (3-acryloxypropyl)trimethoxysilane were dissolved in 180 mL of THF (tetrahydrofuran), and 11 g of 5 wt % N(CH$_3$)$_4$OH aqueous solution was added thereto.

Thereafter, a reaction mixture was reacted under stirring at room temperature for 72 hours. After completion of the reaction, the solvent THF was removed under reduced pressure and a resultant was dissolved in 200 mL of ethyl acetate, and by-products were extracted with a NaCl aqueous solution four times.

Then, an organic layer was dried over MgSO$_4$ and filtered, and then a filtrate was dried under reduced pressure to obtain 23 g of a liquid-phase polyhedral oligomeric silsesquioxane (TA53). A refractive index thereof was 1.425, as measured by using an Abbe refractometer (DTM-1, ATAGO).

Comparative Example 2 g of (nonafluorohexyl)trimethoxysilane and 9.5 g of (3-acryloxypropyl)trimethoxysilane were dissolved in 110 mL of THF (tetrahydrofuran), and 6.5 g of 5 wt % N(CH$_3$)$_4$OH aqueous solution was added thereto.

Thereafter, a reaction mixture was reacted under stirring at room temperature for 72 hours. After completion of the reaction, the solvent THF was removed under reduced pressure and a resultant was dissolved in 170 mL of ethyl acetate, and by-products were extracted with a NaCl aqueous solution four times.

Then, an organic layer was dried over MgSO$_4$ and filtered, and then a filtrate was dried under reduced pressure to obtain 23.5 g of a liquid-phase polyhedral oligomeric silsesquioxane (NA53). A refractive index thereof was 1.389, as measured by using an Abbe refractometer (DTM-1, ATAGO).

Comparative Example 3

30 g of (1H, 1, 2H, 2H-perfluorooctyl)trimethoxysilane and 9 g of (3-acryloxypropyl)trimethoxysilane were dissolved in 102 mL of THF, and 6.3 g of 5 wt % tetramethylammonium hydroxide aqueous solution was added thereto.

Thereafter, a reaction mixture was reacted under stirring at room temperature for 72 hours. After completion of the reaction, the solvent THF was removed under reduced pressure and a resultant was dissolved in 170 mL of ethyl acetate, and by-products were extracted with a NaCl aqueous solution four times.

Then, an organic layer was dried over MgSO$_4$ and filtered, and then a filtrate was dried under reduced pressure to obtain 30 g of a liquid-phase polyhedral oligomeric silsesquioxane (HA62). A refractive index thereof was 1.380, as measured by using an Abbe refractometer (DTM-1, ATAGO).

Evaluation of Compatibility

With respect to the polyhedral oligomeric silsesquioxanes prepared in Examples and Comparative Examples, their solubilities for organic solvents were measured. 0.3 g of each of the polyhedral oligomeric silsesquioxanes was added to 10 ml of respective solvents and observed with the naked eye. When the solution had no transparency, it was evaluated as X.

Conditions of Examples and Comparative Examples and results of evaluating compatibility are summarized in the following Tables 1 and 2.

TABLE 1

|  | Example 1 | Example 2 | Example 3 | Example 4 | Example 5 | Example 6 |
|---|---|---|---|---|---|---|
| note | TNA413 | TNA323 | TNA233 | TNA143 | THA413 | THA323 |
| x | 4 | 3 | 2 | 1 | 4 | 3 |
| y | 1 | 2 | 3 | 4 | 1 | 2 |
| z | 3 | 3 | 3 | 3 | 3 | 3 |
| Solubility (THF) | ○ | ○ | ○ | ○ | ○ | ○ |
| Solubility (MEK) | ○ | ○ | ○ | ○ | ○ | ○ |
| Solubility (MIBK) | ○ | ○ | ○ | ○ | ○ | ○ |
| Solubility (IPA) | ○ | ○ | ○ | ○ | ○ | ○ |
| Refractive index | 1.414 | 1.405 | 1.398 | 1.394 | 1.407 | 1.397 |

TABLE 2

|  | Example 7 | Example 8 | Comparative Example 1 | Comparative Example 2 | Comparative Example 3 |
|---|---|---|---|---|---|
| note | THA233 | THA143 | TA53 | NA53 | HA62 |
| x | 2 | 1 | 5 | — | 5 |
| y | 3 | 4 | — | 5 | — |
| z | 3 | 3 | 3 | 3 | 3 |
| Solubility (THF) | ○ | ○ | ○ | ○ | X |
| Solubility (MEK) | ○ | ○ | ○ | ○ | X |
| Solubility (MIBK) | ○ | ○ | ○ | ○ | X |
| Solubility (IPA) | X | X | ○ | X | X |
| Refractive index | 1.389 | 1.375 | 1.425 | 1.389 | 1.371 |

Referring to the above Tables, it was confirmed that the polyhedral oligomeric silsesquioxanes of Examples of the present invention include all of a moiety having a low halogen substitution ratio, a moiety having a high halogen substitution ratio, and a functional group-substituted moiety, thereby having excellent solubility for various organic solvents while showing a low refractive property.

In contrast, it was confirmed that the polyhedral oligomeric silsesquioxanes of Comparative Examples lack any one monomer moiety of the three moieties, thereby having a high refractive index or reduced compatibility with solvents.

Preparation of Anti-Reflection Film

Example 1-1

Preparation of Hard Coating Film a salt-type anti-static hard coating solution of KYOE-ISHA (solid content: 50 wt %, product name: LJD-1000) was coated onto a triacetyl cellulose film using a #10 mayer bar, and dried at 90° C. for 1 minute. Thereafter, the obtained coating film was irradiated with UV rays of 150 mJ/cm$^2$ to prepare a hard coating layer having a thickness of about 5 μm to 6 μm, thereby preparing a hard coating film.

Preparation of Photocurable Coating Composition for Forming Low Refractive Index Layer 1.1 parts by weight of pentaerythritol tetraacrylate (PETA), 2.1 parts by weight of TNA413 prepared in Example 1, 95.4 parts by weight of a methyl isobutyl ketone solution, in which silica nanoparticles having a particle size of 50 nm to 60 nm were dispersed in an amount of 20% by weight, and 1.4 parts by weight of a photoinitiator (Irgacure 907, Ciba) were mixed. This mixture was diluted with a methyl isobutyl ketone solvent such that a content of the mixture was 12.7% by weight (a solid content of about 3% by weight).

Preparation of Low Refractive Index Layer and Anti-Reflection Film

The hard coating layer of the hard coating film thus prepared was coated with a photocurable coating composition for forming a low refractive index layer by a roll coating method, and dried at about 80° C. for about 2 minutes. Thereafter, the obtained coating film was irradiated with non-polarized UV rays of 200 mW/cm$^2$ using a high pressure mercury lamp to prepare a low refractive index layer, thereby preparing an anti-reflection film.

Example 2-1

An anti-reflection film was prepared in the same manner as in Example 1-1, except that TNA323 of Example 2 was used instead of TNA413 of Example 1.

Example 3-1

An anti-reflection film was prepared in the same manner as in Example 1-1, except that TNA233 of Example 3 was used instead of TNA413 of Example 1.

Example 4-1

An anti-reflection film was prepared in the same manner as in Example 1-1, except that TNA143 of Example 4 was used instead of TNA413 of Example 1.

Example 5-1

An anti-reflection film was prepared in the same manner as in Example 1-1, except that THA413 of Example 5 was used instead of TNA413 of Example 1.

Example 6-1

An anti-reflection film was prepared in the same manner as in Example 1-1, except that THA323 of Example 5 was used instead of TNA413 of Example 1.

Example 7-1

An anti-reflection film was prepared in the same manner as in Example 1-1, except that THA233 of Example 5 was used instead of TNA413 of Example 1.

Example 8-1

An anti-reflection film was prepared in the same manner as in Example 1-1, except that THA143 of Example 5 was used instead of TNA413 of Example 1.

Comparative Example 1-1

An anti-reflection film was prepared in the same manner as in Example 1-1, except that TA53 of Comparative Example 1 was used instead of TNA413 of Example 1.

Comparative Example 2-1

An anti-reflection film was prepared in the same manner as in Example 1-1, except that NA53 of Comparative Example 2 was used instead of TNA413 of Example 1.

Comparative Example 3-1

An anti-reflection film was prepared in the same manner as in Example 1-1, except that HA62 of Comparative Example 3 was used instead of TNA413 of Example 1.

Measurement of Reflectance

With respect to the anti-reflection films obtained in Examples and Comparative Examples, reflectance was measured at an incident angle of 5° in a visible ray wavelength region (about 380 nm to about 780 nm) by using a Solidspec 3700 (Shimadzu).

Measurement of Haze Value

With respect to the anti-reflection films obtained in Examples and Comparative Examples, haze was measured by using a HAZE METER HX-150 of Murakami Color Research Laboratory.

Measurement of Scratch Resistance

Each of the anti-reflection films obtained in Examples and Comparative Examples was loaded with a steel wool, and the surface of each anti-reflection film was rubbed at a speed of 24 rpm 10 times in reciprocating motion. A maximum load, at which 1 or less scratch of 1 cm or less was observed by the naked eye, was measured.

The measurement results are summarized in the following Tables 3 and 4.

TABLE 3

|  | Example 1-1 TNA413 | Example 2-1 TNA323 | Example 3-1 TNA233 | Example 4-1 TNA143 | Example 5-1 THA413 | Example 6-1 THA323 |
|---|---|---|---|---|---|---|
| Reflectance (%) | 0.85 | 0.79 | 0.75 | 0.73 | 0.83 | 0.74 |
| HAZE (%) | 0.1 | 0.2 | 0.2 | 0.3 | 0.2 | 0.3 |
| Scratch resistance (g) | 500 | 500 | 500 | 500 | 500 | 500 |

TABLE 4

|  | Example 7-1 THA233 | Example 8-1 THA143 | Comparative Example 1-1 TA53 | Comparative Example 2-1 NA53 | Comparative Example 3-1 HA62 |
|---|---|---|---|---|---|
| Reflectance (%) | 0.69 | 0.65 | 0.92 | 0.71 | — |
| HAZE (%) | 0.5 | 0.7 | 0.1 | 1.0 | Haze |
| Scratch resistance (g) | 450 | 400 | 500 | 300 | 300 |

Referring to Tables 3 and 4, it was confirmed that the anti-reflection films of Examples exhibited an excellent low reflectance property while having a very low haze value and very excellent scratch resistance, because the polyhedral oligomeric silsesquioxane having an excellent low refractive property was used.

That is, it is believed that the polyhedral oligomeric silsesquioxane of the present invention has a low refractive property as it is and enables formation of a coating layer with excellent chemical and mechanical physical properties, thereby being applied to the surfaces of various substrates for the formation of anti-reflection films.

The invention claimed is:

1. A polyhedral oligomeric silsesquioxane represented by the following Chemical Formula 1:

$(R^1SiO_{1.5})_x(R^2SiO_{1.5})_y(R^3SiO_{1.5})_z$  [Chemical Formula 1]

wherein $R^1$ and $R^2$ are each independently a hydrocarbyl group having 1 to 10 carbon atoms, in which at least one hydrogen atom is substituted with a halogen atom, and $R^1$ has a substitution ratio of the halogen atom in the hydrocarbyl group of less than 50%, and $R^2$ has a substitution ratio of the halogen atom in the hydrocarbyl group of 50% or more, $R^3$ is an unsaturated functional group;

x and y are each independently an integer of 1 to 12, and z is an integer of 2 to 12.

2. The polyhedral oligomeric silsesquioxane of claim 1, wherein $R^1$ is a trifluoropropyl group, a trifluoropentyl group, a pentafluoropentyl group, a trifluorohexyl group, a pentafluorohexyl group, a trifluoroheptyl group, a pentafluoroheptyl group, a heptafluoroheptyl group, a chloropropyl group, or a dibromoethyl group, and $R^2$ is a trifluoromethyl group, a trifluoroethyl group, a pentafluorobutyl group, a heptafluoropentyl group, a heptafluorohexyl group, a nonafluorohexyl group, a nonafluoroheptyl group, or a dodecafluoroheptyl group.

3. The polyhedral oligomeric silsesquioxane of claim 1, wherein x:y is 5:1 to 1:5.

4. The polyhedral oligomeric silsesquioxane of claim 1, wherein $R^3$ is an ethylenic unsaturated functional group or an epoxide unsaturated functional group.

5. The polyhedral oligomeric silsesquioxane of claim 4, wherein $R^3$ is a hydrocarbyl group or a hydrocarbyloxy group having 1 to 30 carbon atoms, which is substituted with one or more substituents selected from the group consisting of a (meth)acryloyl group, a (meth)acryloyloxy group, a glycidyl group, an epoxy group, and a vinyl group.

6. The polyhedral oligomeric silsesquioxane of claim 1, satisfying $6 \le x+y+z \le 30$.

7. The polyhedral oligomeric silsesquioxane of claim 1, satisfying $0.2 \le (x+y)/z \le 3$.

8. The polyhedral oligomeric silsesquioxane of claim 1, wherein a refractive index is 1.20 to 1.50.

9. A coating composition comprising the polyhedral oligomeric silsesquioxane of claim 1.

10. An anti-reflection film comprising a low refractive index layer which is formed by using the coating composition of claim 9.

11. A method of preparing a polyhedral oligomeric silsesquioxane, the method comprising the step of reacting a reaction mixture including a first silane compound represented by the following Chemical Formula 1x, a second silane compound represented by the following Chemical Formula 1y, and a third silane compound represented by the following Chemical Formula 1z:

$R^1SiX^1_3$  [Chemical Formula 1x]

$R^2SiX^2_3$  [Chemical Formula 1y]

$R^3—SiX^3_3$  [Chemical Formula 1z]

wherein $R^1$ and $R^2$ are each independently a hydrocarbyl group having 1 to 10 carbon atoms, in which at least one hydrogen atom is substituted with a halogen atom, and $R^1$ has a substitution ratio of the halogen atom in the hydrocarbyl group of less than 50%, and $R^2$ has a substitution ratio of the halogen atom in the hydrocarbyl group of 50% or more, $R^3$ is an unsaturated functional group;

$X^1$ to $X^3$ are the same as or different from each other, and each independently a halogen atom or an alkoxy group having 1 to 5 carbon atoms.

12. The method of preparing the polyhedral oligomeric silsesquioxane of claim 11, wherein $R^1$ is a trifluoropropyl group, a trifluorobutyl group, a trifluoropentyl group, a pentafluoropentyl group, a trifluorohexyl group, a pentafluorohexyl group, a trifluoroheptyl group, a pentafluoroheptyl group, a heptafluoroheptyl group, a chloropropyl group, or a dibromoethyl group, and $R^2$ is a trifluoromethyl group, a trifluoroethyl group, a pentafluorobutyl group, a heptafluoropentyl group, a heptafluorohexyl group, a nonafluorohexyl group, a nonafluoroheptyl group, or a dodecafluoroheptyl group.

13. The method of preparing the polyhedral oligomeric silsesquioxane of claim 11, wherein $R^3$ is an ethylenic unsaturated functional group or an epoxide unsaturated functional group.

14. The method of preparing the polyhedral oligomeric silsesquioxane of claim 11, wherein the reaction is allowed in the presence of a basic catalyst.

* * * * *